United States Patent [19]

Saeki et al.

[11] 4,322,745
[45] Mar. 30, 1982

[54] TELEVISION SIGNAL SCRAMBLING METHOD FOR CATV SYSTEM

[75] Inventors: Yoshifumi Saeki; Kazuyoshi Onda, both of Tokyo, Japan

[73] Assignee: Pioneer Electronic Corporation, Tokyo, Japan

[21] Appl. No.: 132,444

[22] Filed: Mar. 21, 1980

[30] Foreign Application Priority Data

Mar. 24, 1979 [JP] Japan .................................. 54-34931

[51] Int. Cl.³ ............................................. H04N 7/16
[52] U.S. Cl. .................................... 358/123; 358/114
[58] Field of Search ............... 358/114, 115, 116, 117, 358/122, 123, 86

[56] References Cited

U.S. PATENT DOCUMENTS 3,777,053 12/1973 Wittig et al. ........................ 358/117
3,914,534 10/1975 Forbes ................................... 358/86
4,163,252 7/1979 Mistry .................................. 358/120

Primary Examiner—S. C. Buczinski

Attorney, Agent, or Firm—Sughrue, Mion, Zinn, Macpeak and Seas

[57] ABSTRACT

A television signal scrambling and descrambling method and apparatus for use with a community antenna television system in which the scrambling mode employed is changed from time to time so that one cannot illegally receive the transmitted signals over a long period of time if only one of the scrambling techniques employed is decoded. In the central facility, a plurality of scrambling circuits are provided, one for each scrambling mode desired. A selected one of the scrambling circuits is selected by a switch device which is controlled so as to switch among the scrambling circuits as desired. An identifying signal is transmitted which indicates which of the scrambling circuits is active. In the terminal units at each subscriber's home there is provided a corresponding set of descrambling circuits. The received signal is coupled to the inputs of the descrambling circuits and the appropriate one of the descrambling circuits selected in accordance with the demodulated identifying signal.

7 Claims, 4 Drawing Figures

TELEVISION SIGNAL SCRAMBLING METHOD FOR CATV SYSTEM

BACKGROUND OF THE INVENTION

The present invention relates to community antenna television systems (CATV systems). More paticularly, the invention relates to a television signal scrambling technique for use with a community antenna television system which prevents illegal reception of television signals of broadcast programs.

A CATV system is provided for transmitting television signals of various programs through cables to television sets in terminal units in subscribers' homes. The CATV system is maintained by audience charges paid by the subscribers. Therefore, if there are large numbers of persons who receive the television signals by illegal means, the CATV system will lose a corresponding large amount of revenue. Accordingly, it is necessary to prevent such illegal reception of television signals.

A variety of techniques for preventing the illegal reception of television signals have been proposed in the art. These include a scrambling technique in which the horizontal synchronizing signal is eliminated from the television signal, a scrambling technique in which the vertical synchronizing signal is eliminated from the television signal, and scrambling technique in which one or both synchronizing signals are amplituded with a modulating signal.

Only one of these scrambling techniques has been employed in any one conventional CATV system. Therefore, if the scrambling technique is deciphered and means for receiving the television signal is appropriately designed, then the television signal may be received illegally.

In view of the foregoing, an object of the invention is to provide a television signal scrambling technique for a CATV system in which it is impossible for subscribers to illegally receive television signals continuously for a long period of time.

A typical example of a CATV system will be described with reference to FIG. 1. In this system, terminal units are provided, for instance, in several ten thousands of homes 2 for a single center facility 1. The center 1 and the terminal units form one set or group. The center 1 is connected through coaxial cables to the terminal units in the homes 2. A main cable 3 extends from the center 1. Main cable amplifiers 4 and branching units 5 are provided along the main cable 3 at predetermined points. Plural branch cables 6 extend from each branching unit 5. Extension cable amplifiers 7 and taps 8 are provided along each branch cable 6 at predetermined positions. Plural auxiliary branch cables 9 extend from each tap 8 with the auxiliary branch cables 9 leading into the homes 2. Provided in each home 2 is a terminal unit 28 including a converter 10, a television set 11 and a control box 12. The end of the auxiliary branch cable 9 is connected to the converter 10 which is in turn connected to the television set 11 and the control box 12. In this fashion, the main cable from the center 1 spreads branches repeatedly connecting the center 1 to the terminal units in the homes 2.

A signal receiving antenna 13 is installed outside the center 1. The antenna 13 is connected to a demodulator 15 in a source group 14. The source group 14 includes a video disc player 16, a video tape recorder 17, a studio 18 and other such equipment as desired. Signals from the source group 14 are applied to a modulation and transmission section 19. The section 19 includes two systems. One of the two systems includes an IF modulation circuit 20, a scrambling circuit 21 and an up-converter circuit 22 while the other includes an IF modulation circuit 23 and an up-converter 24. The outputs of the up-converter circuits 22 and 24 are connected to the main cable 3. The main cable 3 is connected to a transmitter-receiver 25 which communicates with the converter 10. The transmitter-receiver 25 is connected to a computer 26 which is connected to peripheral equipment 27 such as a printer and a display unit.

The operation of the CATV system thus constructed will now be described. First, the switch of the television set is turned on and the television set is set to a predetermined designated channel which is preferably not used by local over-the-air stations. The control box 12 is then operated so that the frequency of a desired channel to be received is converted into that of the designated channel by the converter 10. The channels which can be selected by the control box can be classified into a group A channels of which television signals are received over the air and retransmitted without modification, a group B of channels of independent programs provided free of charge and a group C of channels of chargeable programs. Each group has several corresponding channels. Typically, selection can be made from about twenty to thirty channels.

For the group A, a television signal received by the signal receiving antenna is demodulated by the demodulation 15 and then applied to the modulation and transmission section 19. The signal is modulated by the IF modulation circuit 23. The frequency of the signal thus modulated is increased to a predetermined value by the up-converter circuit 24. Thus, the television signal received is changed into a signal upon a desired channel which is then transmitted through the main cable 3, the branch cables 6 and the auxiliary branch cables 9 to the television sets 11.

The independent programs of group B are for instance weather forecast programs and news programs. A television signal provided by the video disc player 16 or the video tape recorder 17 or a television signal from a live program produced in the studio 18 is modulated and frequency-multiplied by the IF modulation circuit 23 and the up-converter circuit 24 into a television signal upon the desired channel which is applied to the main cable 3. The independent programs are free of charge irrespective of the number of times of television signal reception or the period of time of television signal reception. Each subscriber can receive the television signals for a basic monthly charge.

The chargeable programs of group C are typically new movie programs, special programs, or the like. A television signal provided by the video disc player 16 or the video tape recorder 17, or a television signal from a live program produced in the studio 18 is modulated by the IF modulation circuit 20. A scrambling synchronizing signal of predetermined form is added to the video signal in the television signal by the scrambling circuit 21. Because of this signal, if the television signal is received only as it is by the television set, it is impossible to reproduce normal pictures on the television set. The television signal thus treated is applied to the up-converter 22 where its frequency is increased to the frequency of a designated channel. The television signal thus processed is supplied to the main cable 3.

Upon receiving the television signal of the chargeable program by the television set in each home 2, the scrambled television signal is converted into a normal video signal by the converter 10 so that normal pictures can be observed on the television set 11. Whenever a chargeable program is received, a predetermined fee is charged to the subscriber. The sum of the monthly basic charge and the special use fee is billed to the subscriber.

In order to determine whether received programs are free of charge or not, it is necessary to detect what subscribers have used what channels for particular periods of time. For this purpose, the transmitter-receiver 25 outputs a retrieving signal at predetermined time intervals to address the converter 10 in each terminal unit with an address number assigned to that particular terminal unit to determine whether a group C channel is being used at the retrieval time. In response to this, the converter 10 sends to the transmitter-receiver 25 an answering signal representative of the channel which is in use at the retrieval time. The charge data transmitted and received by the transmitter-receiver 25 is arranged and stored by the computer 26 and displayed or printed out by the peripheral equipment 27. As the retrieving signal is transmitted at fixed predetermined time intervals of typically several seconds to several tens of seconds, audience ratings can also be immediately calculated.

A subscriber can choose which programs he wishes to view by operating his control box 12 while watching the television set 11. The subscriber's choice or answer is encoded and sent through the coaxial cables to the center 1.

SUMMARY OF THE INVENTION

In accordance with the above-stated and other objects of the invention, there is provided a method and apparatus for scrambling and descrambling television signals in a community antenna system in which the mode of scrambling is changed from time to time so that one who has decoded a particular scrambling technique cannot receive television signals continuously over a long period of time.

In the central facility of the community antenna system, the television signals to be transmitted are coupled to the inputs of a plurality of scrambling devices. An active one of the scrambling devices is selected by a scramble changeover switch circuit with the outputs of the switch circuit coupled to a transmitter circuit. A signal is generated which identifies which of the scrambling circuits is active at any one particular time. This signal is transmitted over the community antenna system by modulating the audio component of the television signal.

At the terminal unit in each subscriber's home there is provided a corresponding set of descrambling circuits, one for each of the scrambling circuits at the central facility. The received signal over the antenna system is coupled to the inputs of the descrambling devices. The identifying signals sent by the central facility are decoded and used to control a descrambling change-over switch circuit to select the appropriate one of the descrambling circuits. The output of the descrambling change-over circuit is amplified and coupled to the tuner input of the subscriber's television receiver.

DESCRIPTION OF THE PREFERRED EMBODIMENTS

Figure 1:
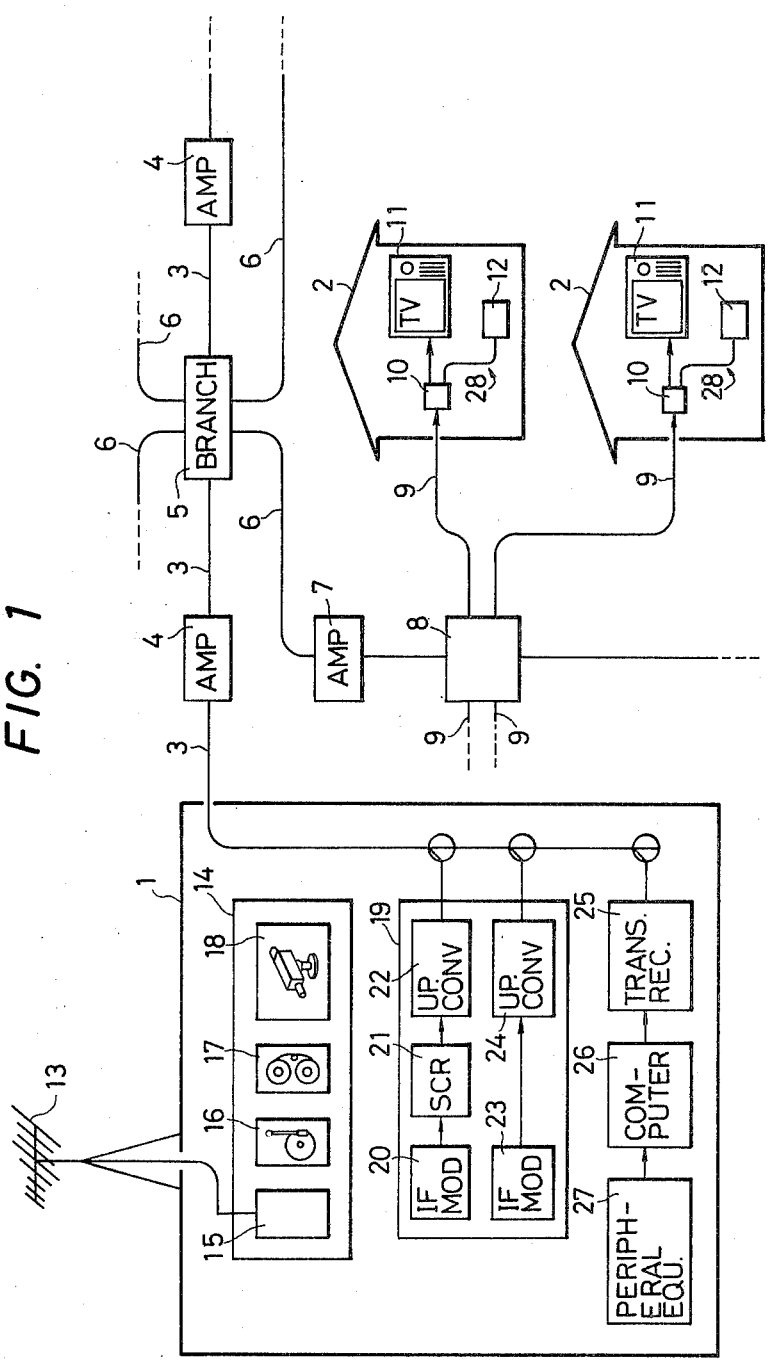
FIG. 1 is an explanatory diagram of a CATV system.
Figure 2:
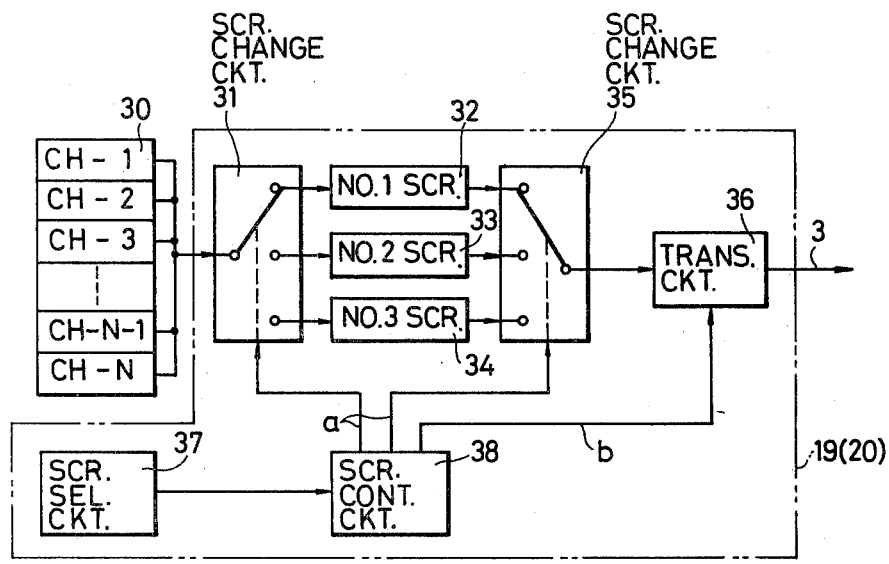
FIG. 2 is a block diagram showing a signal transmitting section in a preferred embodiment of the invention.

FIG. 2 shows a modulation and transmission section 19 provided in the center 1. A channel source 30 corresponds to the demodulator 15, the video disc player 16, the video tape recorder 17 and the studio 18. The output of the channel source 30 is connected to a scramble change-over circuit 31 to the outputs of which are connected, in a parallel mode for instance, three scrambling circuits, specifically first, second and third scrambling circuits 32, 33 and 34. The scrambling modes of these scrambling circuits are different from one another. For instance, the first scrambling circuit 32 may employ a scrambling technique in which a television signal amplitude-modulated in a negative modulation system is converted into one in a positive modulation system. The second scrambling circuit 33 may employ a scrambling technique in which the synchronizing signal in a television signal is detected and a sine wave modulation signal formed in synchronization with the synchronizing signal thus detected amplitude modulates the television signal. The third scrambling circuit 33 may employ a so-called FM-AM scrambling technique in which a sine wave synchronous with the synchronizing signal in a television signal is generated and is then subjected to n frequency division. The sine wave is frequency-modulated with the frequency-divided signal to form a modulated signal and the television signal is amplitude-modulated by the modulated signal.

The outputs of scrambling circuits 32, 33 and 34 are connected to a scramble change-over circuit 35 the output of which is connected to a transmitter circuit 36. The transmitter circuit 36 is connected to the main cable 3. A scramble selecting circuit 37 is operated manually or operated by a timer at predetermined time intervals. The scramble selecting circuit 37 is connected to a scramble control circuit 38. The scramble control circuit 38 outputs a switching signal a for selecting which of the scrambling circuits 32, 33 and 34 is used and a key signal b which serves to identify which scrambling circuit has been selected. The switching signal a is applied to the scramble change-over circuit 31 and 35 and the key signal b is applied to the transmitter circuit 36.

Figure 3:
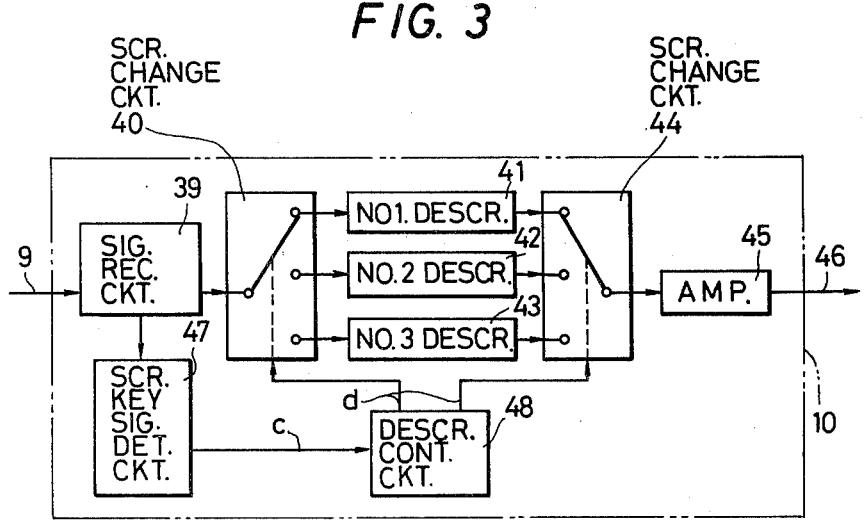
FIG. 3 is a block diagram showing a signal receiving section in accordance with the embodiment of the invention.

FIG. 3 shows a descrambling device which is incorporated into the terminal device 10 in each terminal unit. The auxiliary branch cable 9 is connected to a signal receiving circuit 39 an output of which is connected to a descramble change-over circuit 40. The circuit 40 has outputs connected to first, second and third descrambling circuits 41, 42 and 43 arranged in a parallel mode. The descrambling circuits 41, 42 and 43 are provided in correspondence with the above-described scrambling circuits 32, 33 and 34, respectively. As in the case of the scrambling circuits, the descrambling circuits descramble signals in different manners. In correspondence with the first scrambling circuit 32, the first descrambling circuit 41 employs a descrambling technique in which a television signal modulated in a positive modulation system is again modulated to produce a normal negative modulation signal. In correspondence with the second scrambling circuit 33, the second descrambling circuit 42 employs a descrambling technique in which descrambling is effected with a sine wave synchronous with the synchronizing signal in a television signal. In correspondence with the third scrambling circuit 34, the third descrambling circuit 43 employs a descrambling technique in which descrambling is conducted with an FM-AM modulation wave.

The outputs of the descrambling circuits 41, 42 and 43 are connected to a descramble change-over circuit 44 the output of which is connected to an amplifier 45. The output of the amplifier 45 is coupled through a feeder line 46 to the television set 11. An output of the signal receiving circuit 39 is coupled to a scramble key signal detecting circuit 47. A key signal c detected by the circuit 47 is applied to a descramble control circuit 48 which produces a switching signal d. The switching signal d is applied to the descramble change-over circuits 40 and 44.

In operation, a television signal from the channel source 30 is applied through the scramble change-over circuit 31 to a selected one of the scrambling circuits 32, 33 and 34 where it is subjected to scrambling. The television signal thus scrambled passes through the scramble change-over circuit 35 and is then supplied to the main cable 3 by the transmitter circuit 36.

The television signal transmitted from the center 1 is applied through the branch cable 9 to the signal receiving circuit 39. An output signal of the signal receiving circuit 39 is supplied through the descramble change-over circuit 40 to one of the descrambling circuits 41, 42 and 43, selected in correspondence with the active scrambling circuit, where it is restored to a normal television signal. The normal television signal thus produced is applied through the descramble change-over circuit 44 to the amplifier 45 where it is suitably amplified and the resultant television signal is supplied to the television set 11.

To change the scrambling technique utilized after the lapse of a predetermined period of time or when required, the scramble selecting circuit 37 is operated to apply a control signal to the scramble control circuit 38. As a result, the scramble control circuit 38 applies the switching signal a to the scramble change-over circuits 31 and 35 whereby another one of the first through third scrambling circuits 32, 33 and 34 is selected. Simultaneously with the generation of the switching signal a, the scramble control circuit 38 produces the key signal b which is superposed on the audio portion of the television signal which is supplied to the main cable 3. On the signal receiving side, the signal receiving circuit 39 detects the audio signal which is then applied the scramble key signal detecting circuit 47 as a result of which the key signal c is extracted. The key signal c is applied to the descramble control circuit 48. Upon reception of the key signal c, the descramble control circuit 48 applies the switching signal d to the descramble change-over circuits 40 and 44. For this, the circuits 40 and 44 are switches for selecting the one of descrambling circuits 41 through 43 which corresponds to the afore mentioned one of the scrambling circuits 32 through 34. Thus, in correspondence with the scrambling technique selected by the signal transmitting side, the correct descrambling technique is automatically selected at the signal receiving side so that the subscriber receives the television signal without interruption. A person who has deciphered one of the scrambling techniques may illegally receive the television signal for a period of time. However, after the scrambling technique utilized has been changed, he can no longer receive the television signal.

In the above-described embodiment of the invention, the first through third scrambling circuits 32 through 34 employ different scrambling techniques. However, the device may be modified for example, so that, although the scrambling circuits 32 through 34 employ the same scrambling technique, the scrambling circuits are different from one another in the degree or factor of scrambling modulation. Furthermore, in the above-described embodiment, three different scrambling circuits are employed. However, it should be noted that the invention is not limited thereto or thereby. That is, any number of scrambling circuits may be employed with any combination of scrambling techniques.

As is clear from the above description, according to the invention, the same scrambling circuit is not used at all times. That is, the scrambling circuit is switched depending on the particular conditions. Therefore, even if the content of the scrambling technique has been deciphered and the television signal has been illegally received, the reception will shortly be terminated. Furthermore, as described above, a plurality of scrambling techniques are selected from. Therefore, even if the scrambling techniques employed are relatively simple, illegal reception of the television signals is substantially prevented.

Figure 4:
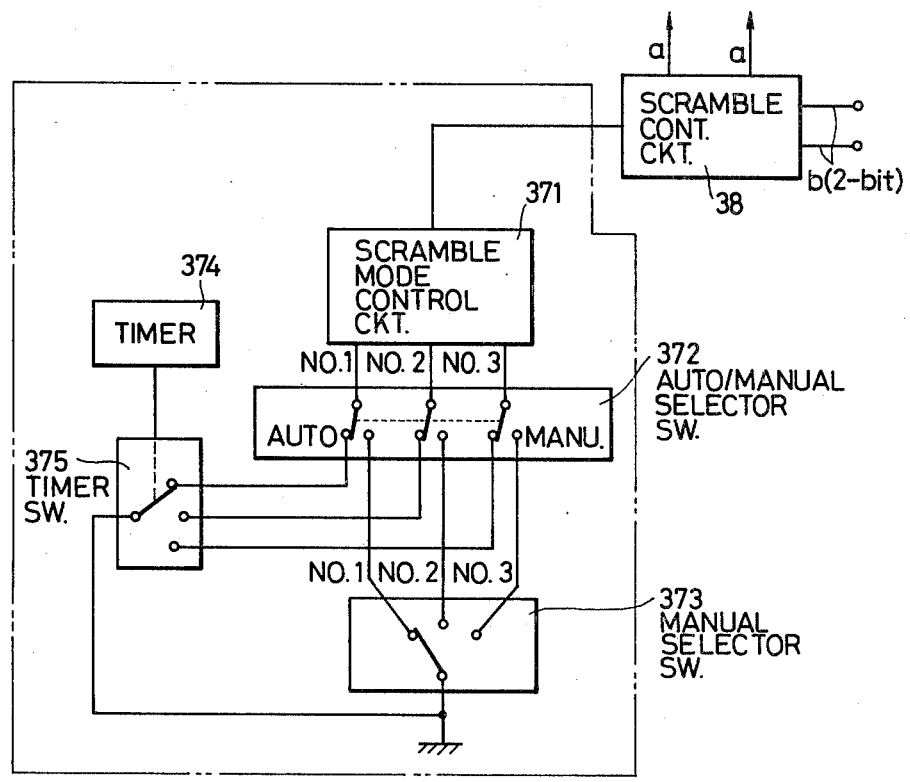
FIG. 4 is a schematic diagram showing details of the scrambling selecting circuit of FIG. 2.

Referring next to FIG. 4 there is shown a block schematic diagram relating to the details of the scrambling selecting circuit 37 shown in FIG. 2. The scrambling selecting circuit 37 includes a timer 374 and a switch 375 the position of which is periodically sequenced through its three positions in accordance with the production of output pulses by timer 374. For instance, switch 375 may be provided as an electronic switch constituted by a three-bit ring counter. The three output lines from timer 375 are coupled to three corresponding inputs of auto/manual selector switch 372. Auto/manual selector switch 372 includes three single-pole-throw switches which are ganged together. The second input of each of the switches of the auto/manual selector switch 375 is coupled to a corresponding output line from manual selector switch 373. In the position shown in FIG. 4, the auto/manual selector switch 372 then couples outputs from timer switch 375 to the inputs of scramble mode control circuit 371. In the other position, the manual position, the outputs of manual selector switch 373 are coupled to the inputs of scramble mode control circuit 371. In this fashion, when set to the automatic position, the inputs to the scramble mode control circuit 371 are periodically and automatically sequenced whereas in the manual position, the input to the scramble mode control circuit 371 may be manually set by the manual selector switch 373. As in the case of timer switch 375, the auto/manual selector switch 372 may be constituted by an electronic switch such as an electronic digital gating circuit.

Scramble mode control circuit 371 responds to the input applied thereto by providing a stream of serial digital data corresponding to the selected terminal. For three scrambling loads, a two-bit code is sufficient. For this purpose, the scramble mode control circuit 371 may be constituted by a simple read only memory device which is sequenced through its address position periodically with the address also determined in accordance with the inputs applied thereto from the auto/manual selector switch 372.

The output of the scramble mode control circuit 371 is coupled to the control input of scramble control circuit 38. In scramble control circuit 38, the serial data produced by the scramble mode control circuit 371 is converted to parallel form on lines b. For example, if the signal delivered from the center is expressed by eight-bit serial data of the form ABCDEFGP, where P represents a parity check bit, a signal represented by FG can be utilized for the information data on the line b representative of the key signal as previously mentioned.

In the terminal device 10, the signal FG is detected in the detector circuit 47 and then applied to the control circuit 48 which sets the scramble change-over circuit 40 and descramble change-over circuit 44 to choose the appropriate descrambling circuit 41, 42 or 43.

What is claimed is:

1. A television signal scrambling method for community antenna television system in which a central facility is coupled through cables to a number of terminal units for transmitting television signals from said central facility to said terminals and in which a plurality of scrambling circuits are provided in said central facility and a plurality of descrambling circuits corresponding to said scrambling circuits are provided in each terminal unit comprising the steps of: scrambling a television signal by selectively activating at different times at least two of said scrambling circuits and descrambling the the scrambled television signal in each terminal unit by selectively activating at said different times said descrambling circuits which correspond in scrambling mode to the activated scrambling circuits.

2. The television signal scrambling method of claim 1 further comprising the steps of providing a signal identifying which of said scrambling circuits in said central facility is activated and selecting the corresponding one of said descrambling circuits in accordance with said identifying signal.

3. A transmitting device for a central facility in a community antenna television system for scrambling signals transmitted from said central facility comprising: a transmitter; a plurality of scrambling circuits, at least some of said scrambling circuits employing different scrambling modes; a source of television signals coupled to inputs of said scrambling circuits; a scrambling change-over switch circuit having inputs coupled to receive outputs of said scrambling circuits and an output coupled to said transmitter; and switch control means coupled to a switch control input of said scrambling change-over switch circuit for selecting at different times different ones said scrambling circuits.

4. The system of claim 3 further comprising means for producing a signal transmitted by said transmitter for identifying which of said scrambling circuit is active.

5. The system of claim 4 wherein said identifying signal producing means comprises means for modulating an audio signal of a television signal.

6. A terminal unit for use with a community antenna television system in which signals are transmitted from a central facility of said community antenna system utilizing one of a plurality of selectable scrambling modes comprising: a signal receiving circuit; a plurality of descrambling circuits, a different one of said scrambling circuits being provided for each of the scrambling modes which may be transmitted at different times by said central facility; means for coupling an output received signal from said signal receiving circuit to inputs of each of said descrambling circuits; a descrambling change-over switch circuit having inputs coupled to receive outputs of said descrambling circuits; and means coupled to a control input of said descrambling change-over circuit for selecting at each of said different times the one of said descrambling circuits which corresponds to the transmitted scrambling mode.

7. The terminal unit of claim 6 wherein said selecting means comprises means for producing a control signal in response to an audio component of the signal received by said signal receiving circuit.

* * * * *